(12) United States Patent
Kern et al.

(10) Patent No.: US 7,514,810 B2
(45) Date of Patent: Apr. 7, 2009

(54) ELECTRIC POWER GENERATION USING POWER TURBINE AFT OF LPT

(75) Inventors: John M. Kern, Rexford, NY (US);
KiYoung Chung, West Chester, OH (US); Ronghai Qu, Clifton Park, NY (US); Wei Wu, Rexford, NY (US); Craig D. Young, Clifton Park, NY (US); Peter D. Toot, Cincinnati, OH (US); Christopher Glynn, Hamilton, OH (US); Tom Compton, Westchester, OH (US)

(73) Assignee: General Electric Company, Schenectady, NY (US)

( * ) Notice: Subject to any disclaimer, the term of this patent is extended or adjusted under 35 U.S.C. 154(b) by 43 days.

(21) Appl. No.: 11/611,485

(22) Filed: Dec. 15, 2006

(65) Prior Publication Data

US 2008/0143115 A1 Jun. 19, 2008

(51) Int. Cl.
*F02C 1/06* (2006.01)
(52) U.S. Cl. ...................................................... 290/52
(58) Field of Classification Search .................. 290/52
See application file for complete search history.

(56) References Cited

U.S. PATENT DOCUMENTS

| | | | |
|---|---|---|---|
| 2,547,093 A | 4/1951 | Ray | |
| 2,708,343 A * | 5/1955 | Brown et al. | 60/39.281 |
| 2,722,617 A | 11/1955 | Cluwen et al. | |
| 3,037,345 A * | 6/1962 | Sonnefeld | 60/264 |
| 3,307,351 A | 3/1967 | Wheeler et al. | |
| 3,465,162 A | 9/1969 | Oprecht et al. | |
| 3,596,122 A | 7/1971 | Stewart | |
| 3,635,019 A | 1/1972 | Kronogard et al. | |
| 3,741,727 A * | 6/1973 | Sedlock et al. | 436/182 |
| 4,454,465 A * | 6/1984 | Greene | 322/49 |
| 5,301,500 A * | 4/1994 | Hines | 60/792 |
| 5,309,029 A * | 5/1994 | Gregory et al. | 290/1 R |
| 5,327,069 A * | 7/1994 | Radun et al. | 322/10 |
| 5,376,827 A | 12/1994 | Hines | |
| 5,703,421 A * | 12/1997 | Durkin | 310/61 |
| 5,793,136 A | 8/1998 | Redzic | |
| 6,270,309 B1 | 8/2001 | Ghetzler et al. | |
| 6,376,957 B1 * | 4/2002 | Haydock et al. | 310/155 |
| 6,467,725 B1 * | 10/2002 | Coles et al. | 244/58 |
| 6,791,222 B1 | 9/2004 | Maslov et al. | |
| 6,910,335 B2 | 6/2005 | Viteri et al. | |
| 6,949,855 B2 * | 9/2005 | Dubois et al. | 310/152 |
| 7,216,475 B2 * | 5/2007 | Johnson | 60/226.1 |
| 2004/0168427 A1 * | 9/2004 | Truco et al. | 60/226.1 |
| 2005/0056021 A1 * | 3/2005 | Belokon et al. | 60/772 |
| 2005/0077800 A1 | 4/2005 | Hoeijmakers | |
| 2006/0071575 A1 | 4/2006 | Jansen et al. | |

\* cited by examiner

*Primary Examiner*—Joseph Waks
(74) *Attorney, Agent, or Firm*—McNees Wallace & Nurick, LLC (57) ABSTRACT

An inside out generator disposed aft of the low-pressure turbine spool to generate power for the electrical demands of an aircraft system. The low-pressure turbine discharge flow is used to drive the power turbine, which is coupled to the generator. The generator is able to extract power at idle conditions of the aircraft engine from ducting the discharge through the inside out generator. The system eliminates the placement of a generator in the hot gas path of the discharge, and enables the injection of power directly to the accessory gear box of the engine.

12 Claims, 13 Drawing Sheets

ELECTRIC POWER GENERATION USING POWER TURBINE AFT OF LPT

FIELD OF THE INVENTION

The present invention relates to electrical machines, and more particularly to the production of electrical power from gas turbine engines.

BACKGROUND OF THE INVENTION

A gas turbine engine generally includes one or more compressors followed in turn by a combustor and high and low pressure turbines. These engine components are arranged in serial flow communication and disposed about a longitudinal axis centerline of the engine within an annular outer casing. The compressors are driven by the respective turbines and compressor air during operation. The compressor air is mixed with fuel and ignited in the combustor for generating hot combustion gases. The combustion gases flow through the high and low pressure turbines, which extract the energy generated by the hot combustion gases for driving the compressors, and for producing auxiliary output power.

The engine power is transferred either as shaft power or thrust for powering an aircraft in flight. For example, in other rotatable loads, such as a fan rotor in a by-pass turbofan engine, or propellers in a gas turbine propeller engine, power is extracted from the high and low pressure turbines for driving the respective fan rotor and the propellers.

It is well understood that individual components of turbofan engines, in operation, require different power parameters. For example, the fan rotational speed is limited to a degree by the tip velocity and, since the fan diameter is very large, rotational speed must be very low. The core compressor, on the other hand, because of its much smaller tip diameter, can be driven at a higher rotational speed. Therefore, separate high and low turbines with independent power transmitting devices are necessary for the fan and core compressor in aircraft gas turbine engines. Furthermore since a turbine is most efficient at higher rotational speeds, the lower speed turbine driving the fan requires additional stages to extract the necessary power.

Many new aircraft systems are designed to accommodate electrical loads that are greater than those on current aircraft systems. The electrical system specifications of commercial airliner designs currently being developed may demand up to twice the electrical power of current commercial airliners. This increased electrical power demand must be derived from mechanical power extracted from the engines that power the aircraft. When operating an aircraft engine at relatively low power levels, e.g., while idly descending from altitude, extracting additional electrical power from the engine mechanical power may reduce the ability to operate the engine properly.

Traditionally, electrical power is extracted from the high-pressure (HP) engine spool in a gas turbine engine. The relatively high operating speed of the HP engine spool makes it an ideal source of mechanical power to drive the electrical generators connected to the engine. However, it is desirable to draw power from additional sources within the engine, rather than rely solely on the HP engine spool to drive the electrical generators. Extracting this additional mechanical power from an engine when it is operating at relatively low power levels (e.g., at or near idle descending from altitude, low power for taxi, etc.) may lead to reduced engine operability. The LP engine spool provides an alternate source of power transfer, however, the relatively lower speed of the low-pressure (LP) engine spool typically requires the use of a gearbox, as slow-speed electrical generators are often larger than similarly rated electrical generators operating at higher speeds. The boost cavity of gas turbine engines has available space that is capable of housing an inside out electric generator, however, the boost section rotates at the speed of the LP engine spool.

Many solutions to this transformation are possible, including various types of conventional transmissions, mechanical gearing, and electromechanical configurations. One solution is a turbine engine with a third, intermediate (IP) pressure spool. The IP spool is understood to also require coupling to the HP spool for adequate operation. This coupling mechanism is often referred to as a mechanical clutch or viscous-type coupling mechanism. While this approach can provide power sufficient to operate the aircraft system, it does not directly address the problems associated with producing supplemental electrical power while the engine is running at lower speeds or at idle.

U.S. Pat. No. 6,895,741, issued May 24, 2005, and entitled "Differential Geared Turbine Engine with Torque Modulation Capacity", discloses a mechanically geared engine having three shafts. The fan, compressor, and turbine shafts are mechanically coupled by applying additional epicyclic gear arrangements. The effective gear ratio is variable through the use of electromagnetic machines and power conversion equipment. However, this system has not been widely used in practical applications.

Another method and system for providing electric power for an aircraft uses an engine where a generator is placed aft of the LP turbine. This method and system allows the generation of electricity from the engine even during times when the engine is running on low or idle speeds. However, the hot gasses exhausted from the LP turbine are corrosive and create damaging conditions for typical electric generators.

Thus, what is needed is a method or system to extract electrical power from the engine that will allow electrical power to be generated during low engine operating power levels without reducing engine operability, but will satisfy the increasing electrical demands of the aircraft.

SUMMARY OF THE INVENTION

The following paragraphs summarize the embodiments of the present invention defined by the independent claims appended hereto. One embodiment of the present invention is a system for generating electrical energy including an engine having a high-pressure turbine, a low-pressure turbine, an aft turbine and a discharge flow. The system also includes a generator having a plurality of stator coils, a stator core and a rotor core, and placed aft of the low-pressure turbine. Further, the system includes a plurality of ducts, and a variable nozzle. The variable nozzle controls the air flow in the plurality of ducts, and the air flow in at least one duct of the plurality of ducts provides excitation to the rotor and also channels air flow in at least one duct of the plurality of ducts above the system to bypass the generator.

Another embodiment of the present invention is a system for an aircraft engine for generating electric energy including an inside out generator placed aft of a low pressure turbine of the aircraft engine, a plurality of stator coils, a stator core, and a rotor core and a plurality of ducts. The plurality of ducts distributes a discharge flow of the aircraft engine to provide excitation to the rotor core to produce electric power.

One advantage of the present invention is greater power extraction from the turbofan engines.

Another advantage of the present invention is controllable power extraction from the turbofan engines.

Yet another advantage of the present invention is the production of energy at idle from the exhaust of the low-pressure turbine.

Another advantage of the present invention is that when extra power generation is not desired, thrust path of the engine is not obstructed.

Another advantage of the present invention is that the speed of the aft mounted turbine is independent of the other engine spools and does not mechanically impact engine performance or operability, the turbine can be driven at high speeds, thereby reducing the required size of the generator.

Another advantage of the present invention is the use of an inside-out generator that enables the use of electromagnetic machine types suitable for the harsh environment of the aft section of the engine.

Yet another advantage of the present invention is that the placement of the generator aft of the turbine engine enables injection of power into the accessory gearbox.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
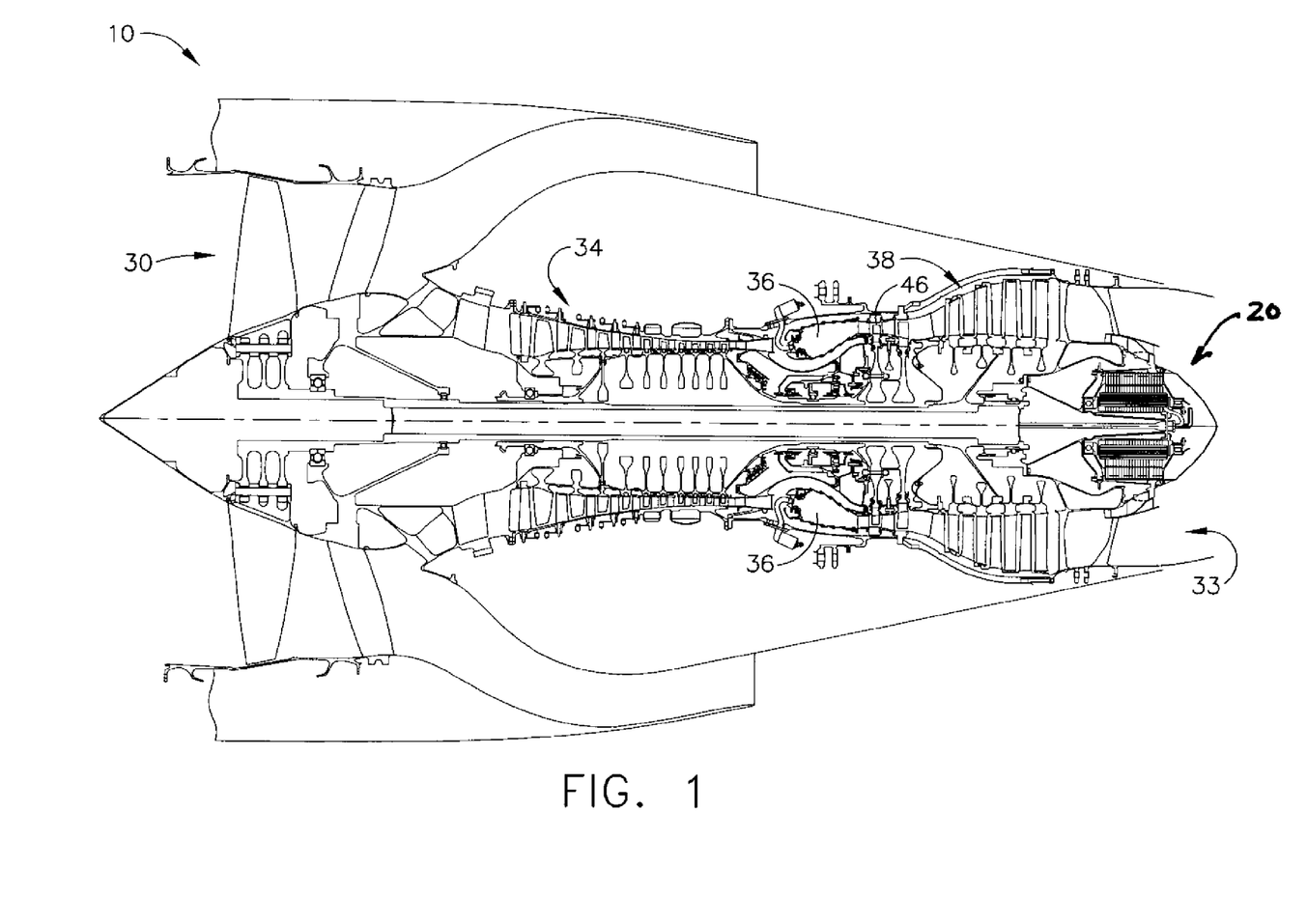
FIG. 1 illustrates a current turbine engine system.

A typical gas turbine engine 10 consists of four basic elements shown in FIG. 1, the compressor 34 which increases the pressure and temperature of the air that enters an inlet 30, a combustion chamber 36 that raises the temperature and pressure of the air further, a high pressure and low pressure turbine 38, 46 that converts the temperature rise into rotational energy, and an exhaust nozzle 33 which accelerates the air using the remainder of the energy added in the combustor 36, which produces a high velocity jet exhaust that propels an aircraft through the air at high speeds.

Figure 2:
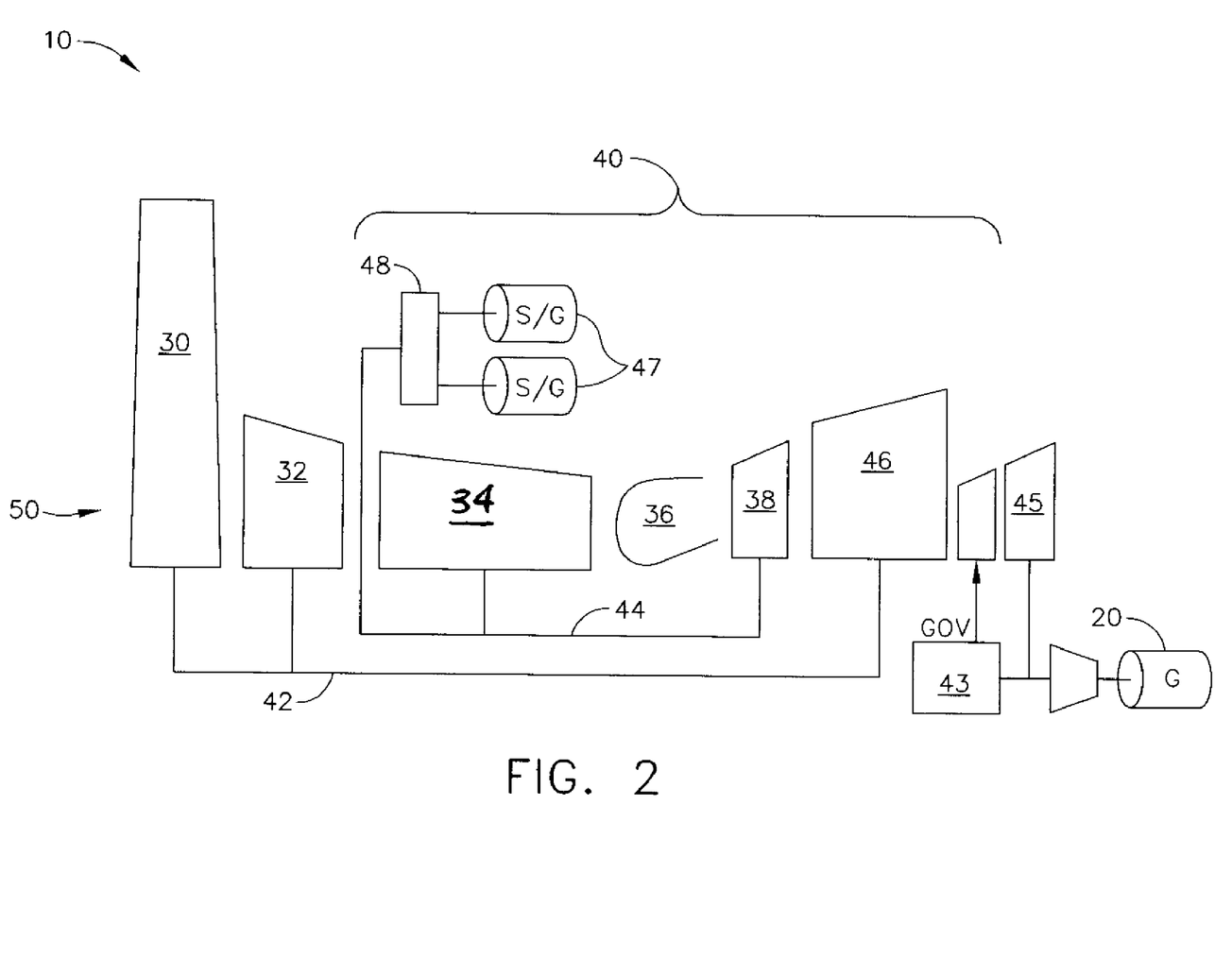
FIG. 2 illustrates a component level model of the present invention.

FIG. 2 illustrates a component model of a gas turbine engine 10 where the inside out generator 20 is placed aft of the low-pressure turbine 46. The engine 10 has a serial axial flow relationship between the components, which include a high-pressure compressor 34, a combustor or burner 36, and a high-pressure turbine 38. These components make up the core engine 40, and are downstream from an inlet fan 30 and booster 32. The fan 30 and booster 32 are in a serial, axial flow relationship with the core engine 40. The fan 30, booster 32 and low-pressure turbine 46 are coupled by a first shaft 42, while the compressor 34 and high pressure turbine 38 are coupled with a second shaft 44. The airflow passes through the core engine 40 and is exhausted through a core engine nozzle (not shown). The inside out generator 20 is in a serial, axial flow relationship with the low-pressure turbine spool 46. The aft power turbine 45 is located aft of the low-pressure turbine 46 and is mechanically coupled to the governor 43, and inside out generator 20. The discharge flow from the low pressure turbine 46 drives the power of the aft power turbine 45. FIG. 2 also shows the accessory gearbox 48 and high-pressure starters and generators 47 that are serially connected to the core engine 40 via the high pressure spool 44.

Figure 3:
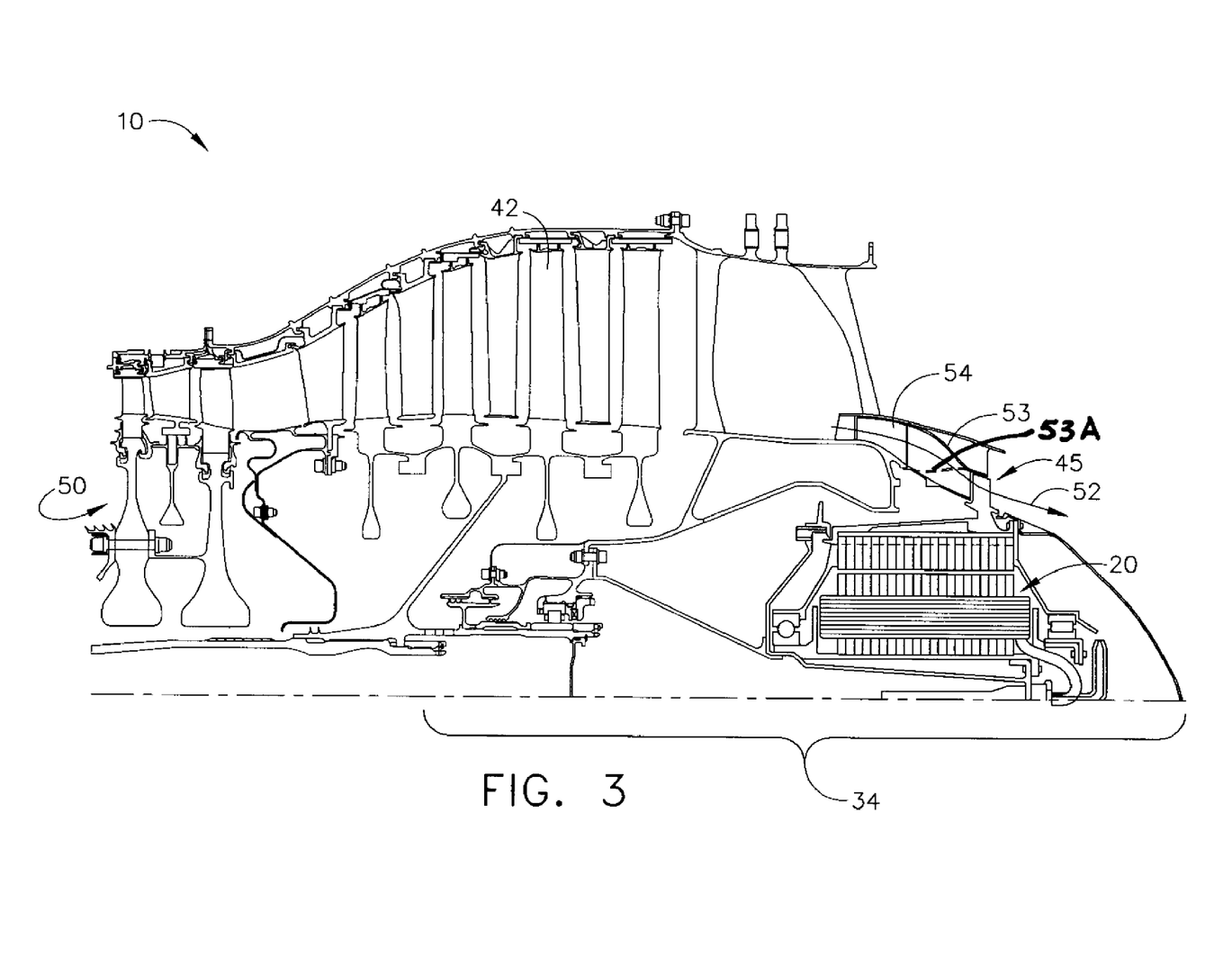
FIG. 3 illustrates a cross sectional view of the switch reluctance inside out generator of the present invention.
Figure 12:
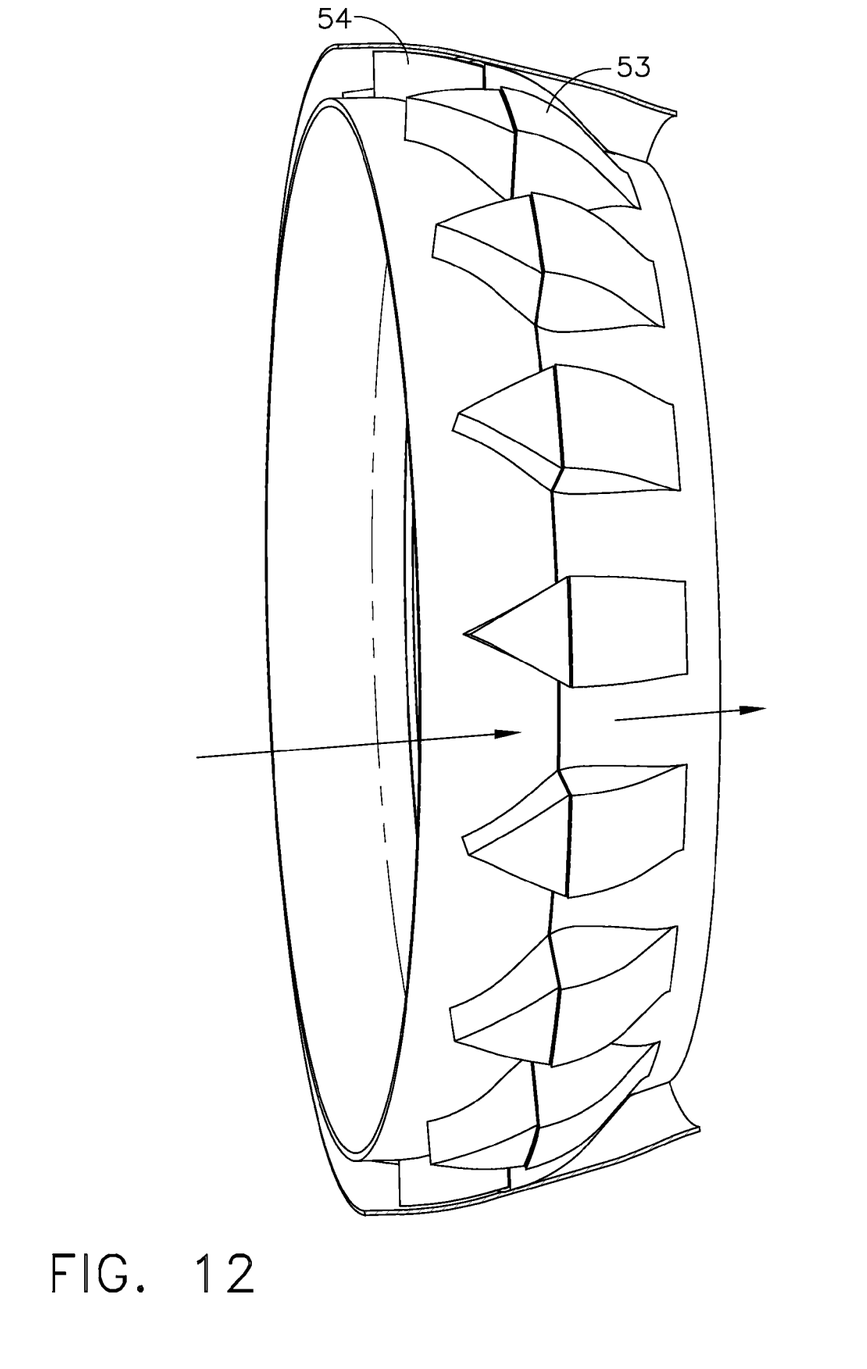
FIG. 12 illustrates the aft turbine positioned to bypass the aft turbine.
Figure 13:
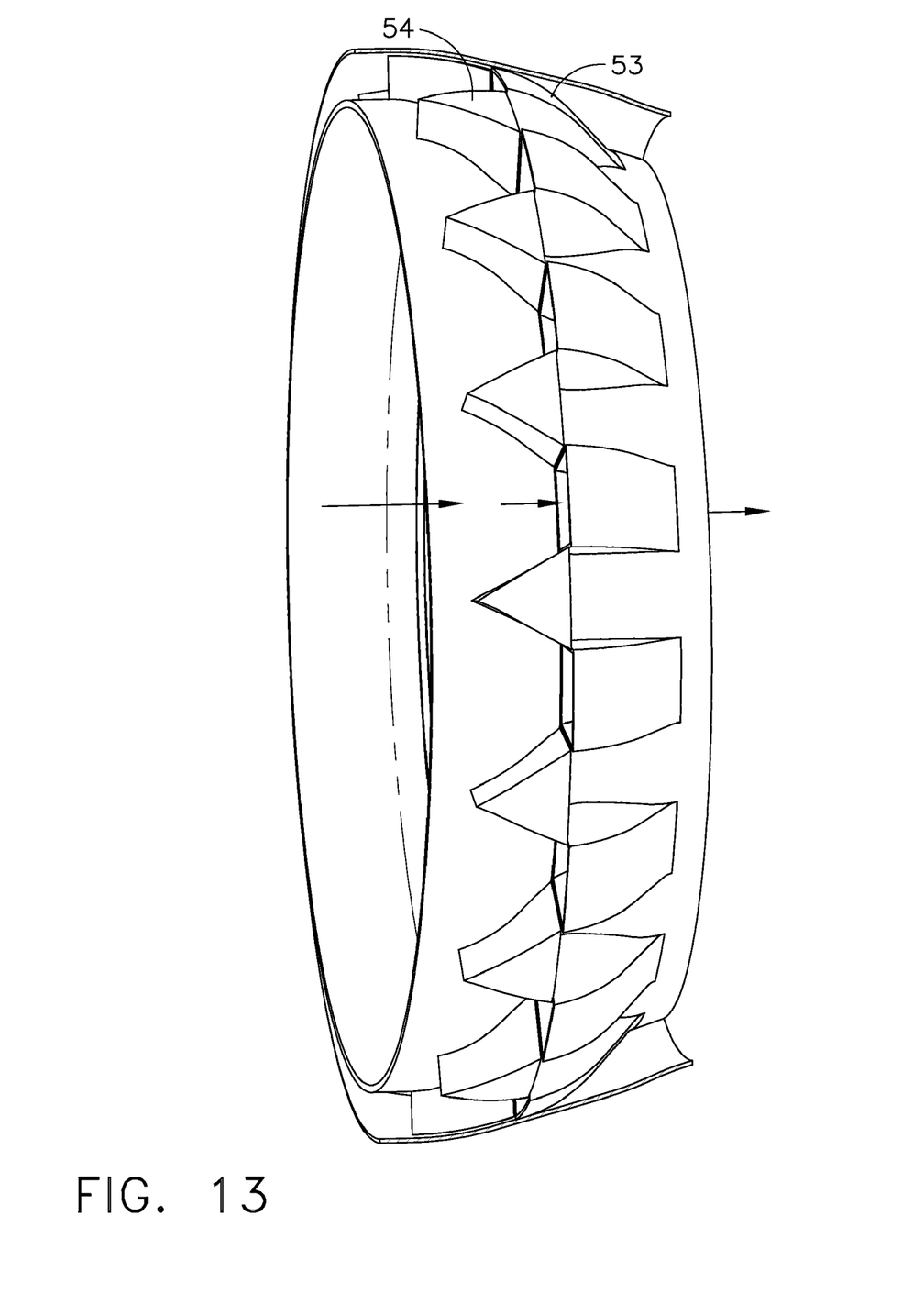
FIG. 13 illustrates the aft turbine positioned to supply the aft turbine.

One embodiment of the invention for electric power extraction shown in FIG. 3 is an inside out generator 20 disposed aft of the low pressure turbine spool 42. The placement of the inside out generator 20 in the aft portion of the engine 10 allows the generator 20 to be disposed in the harsh conditions of the compressor 34. The normal airflow through the engine 10 flows in through the inlet 50 through the core engine (not shown), both the high pressure and low-pressure turbines 38, 46, and the air is exhausted through the outlet 52. In the embodiment shown in FIG. 3, a duct 54 diverts a portion of the airflow from the exhausted flow aft of the low pressure turbine 46 through the turbine blades of the inside out generator 20 during idle or lower operating levels of the engine 10. The flow path of the engine 10 is selectively diverted such that the exhausted air from the low-pressure turbine 46 is only drawn through the aft turbine blades 45 when additional power extraction is required to produce electrical energy to the aircraft. Typically, the additional electrical power generation is required when the engine 10 is running at any level below full operation, such as idle. Because the duct 54 directs the airflow into the aft turbine by direction of the actuating nozzle 53 when the electrical energy is necessary, e.g., when the aircraft is operating at full power, such as during take off, the obstruction of the engine's 10 air flow path is kept at a minimum, thereby reducing any losses and increasing efficiency of the aircraft engine 10. The airflow is diverted by a variable nozzle 53 in the duct 54 that transitions between a first and second position to either allow or prevent airflow through the turbine blades of the inside out generator 20. FIGS. 12 and 13 illustrate the aft turbine of the present invention as positioned to bypass the aft turbine (FIG. 12) and to supply the aft turbine (FIG. 13). Referring back to FIG. 3, the nozzle 53 is shown in the open position, indicating that all of air flow into duct 54 is directed into the aft turbine blades 45. The broken line 53A is the closed or bypass position of the nozzle 53. Alternatively, the nozzle may also have positions anywhere in between the first and second positions to allow, but limit, the airflow to the turbine blades of the inside out generator 20.

The speed of the aft mounted turbine 45 is independent of the other engine spools because the low-pressure spool 46 is serially connected to the fan 30 and booster 32, while the high-pressure spool 46 is serially connected to the core engine 40. Because the high-pressure 38 and low-pressure 46 spools are serially connected and operate independently from the aft turbine 45, the operation of the inside out generator 20 with the aft turbine 45 does not mechanically impact engine performance or operability. In addition to operating at idle and lower speeds, the low-pressure turbine 46 can be driven at high speeds as well, which produces more power for electric generation, and thereby reducing the required size of the necessary generator. The materials used for the generator are able to resist the harsh corrosive gasses produced and carried in the air flow of the engine, and are also able to resist the high temperatures of the exhausted air flow from the turbines. Thus, the use of the inside out generator 20 enables the use of electromagnetic machine types that are suitable for the harsh environment of the aft section of the engine.

Figure 4:
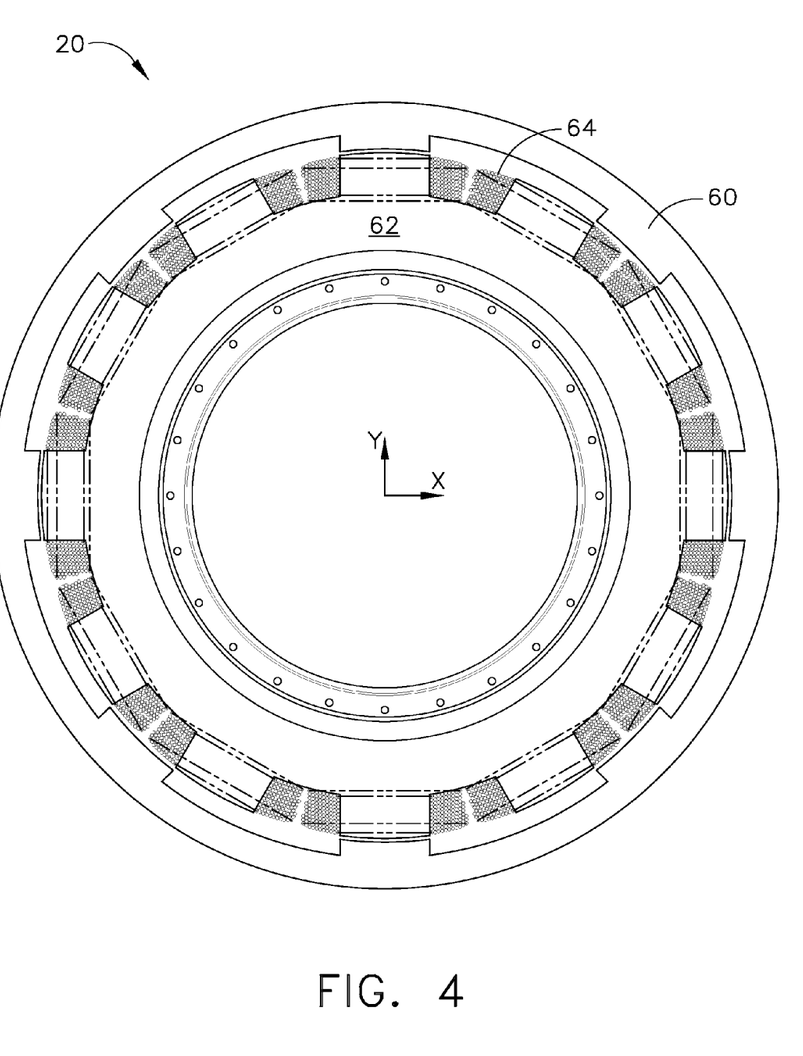
FIG. 4 illustrates a cross sectional view of the inside out configuration of generator of the present invention.

FIG. 4 illustrates the components and arrangement of the inside out generator 20. The generator 20 includes a rotor core 60, a stator core 62 and multiple stator coils 64. The stator core 62 and stator coil 64 are disposed inside the rotor core 60 and are static, being secured by brackets or other suitable securing means (not shown). The stator and rotor cores 62, 60 are preferably formed by using a soft magnetic composite material such as iron, magnetic steel, silicon iron, iron-cobalt alloys or any other suitable material that is easily magnetized and demagnetized in order to withstand the harsh conditions aft of the engine. In addition, the stator 62 is located concentrically and inside of the machine's rotating field. This placement enables the use of generator machine types that do not require windings on the rotor, such as a switched reluctance type generator, a synchronous reluctance type machine or any other suitable type of electric machine. Further, because the stator 62 is mechanically static, i.e. does not rotate, it may be easily connected to fluid coolant lines of the engine. The rotor 60 may not require any cooling due to the absence of coils which is otherwise the major heating source. Because the generator 20 is located in a high-temperature section of the engine 10, no cooling or the simplified cooling attribute of the inner stator 62 is essential property of the generator 20. Cooling methods for stator 62 includes, but are not limited to air cooling, oil conduction cooling, and oil spray cooling.

An alternative embodiment (not shown) to the present invention includes the low-pressure turbine 46 shaft geared to a power take off shaft (not shown) that couples through a gearbox (not shown) to an externally mounted generator. In this embodiment, the generator 51 is located in a less harsh environment from aft of the low-pressure turbine 46. The generator may be located either inside or outside of the main engine 40.

In yet another embodiment (not shown) of the present invention, the aft turbine 45 is geared to a power take off shaft that is coupled to the main engine's accessory gearbox (See FIG. 2). An over-running mechanism (not shown) is provided in the power path to allow the aft turbine to idle without effect on the accessory gearbox, and to provide power to the accessory gearbox when thrust is ducted to the aft turbine.

Figure 5A:
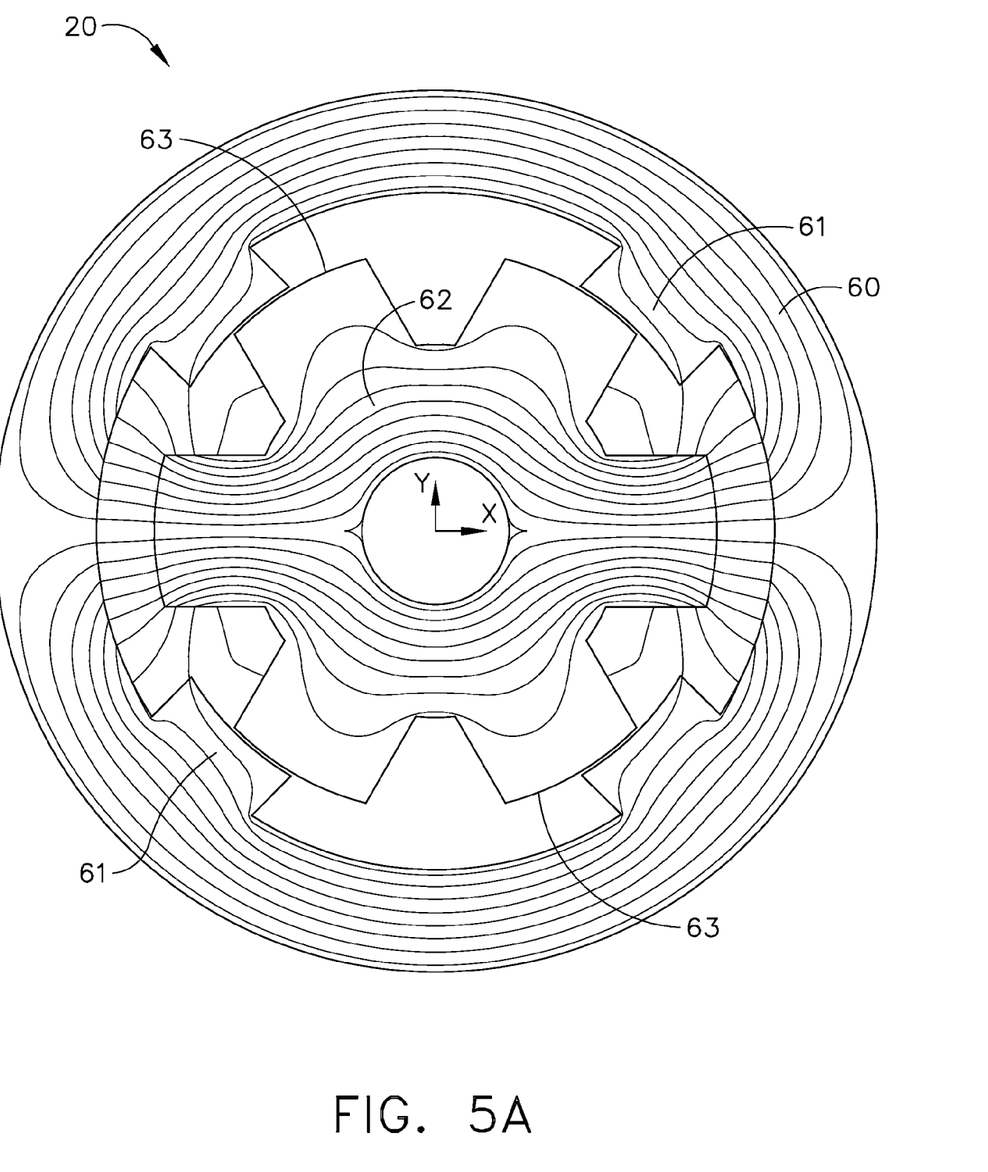
FIG. 5A illustrates the disengaged flux distribution of the present invention.
Figure 5B:
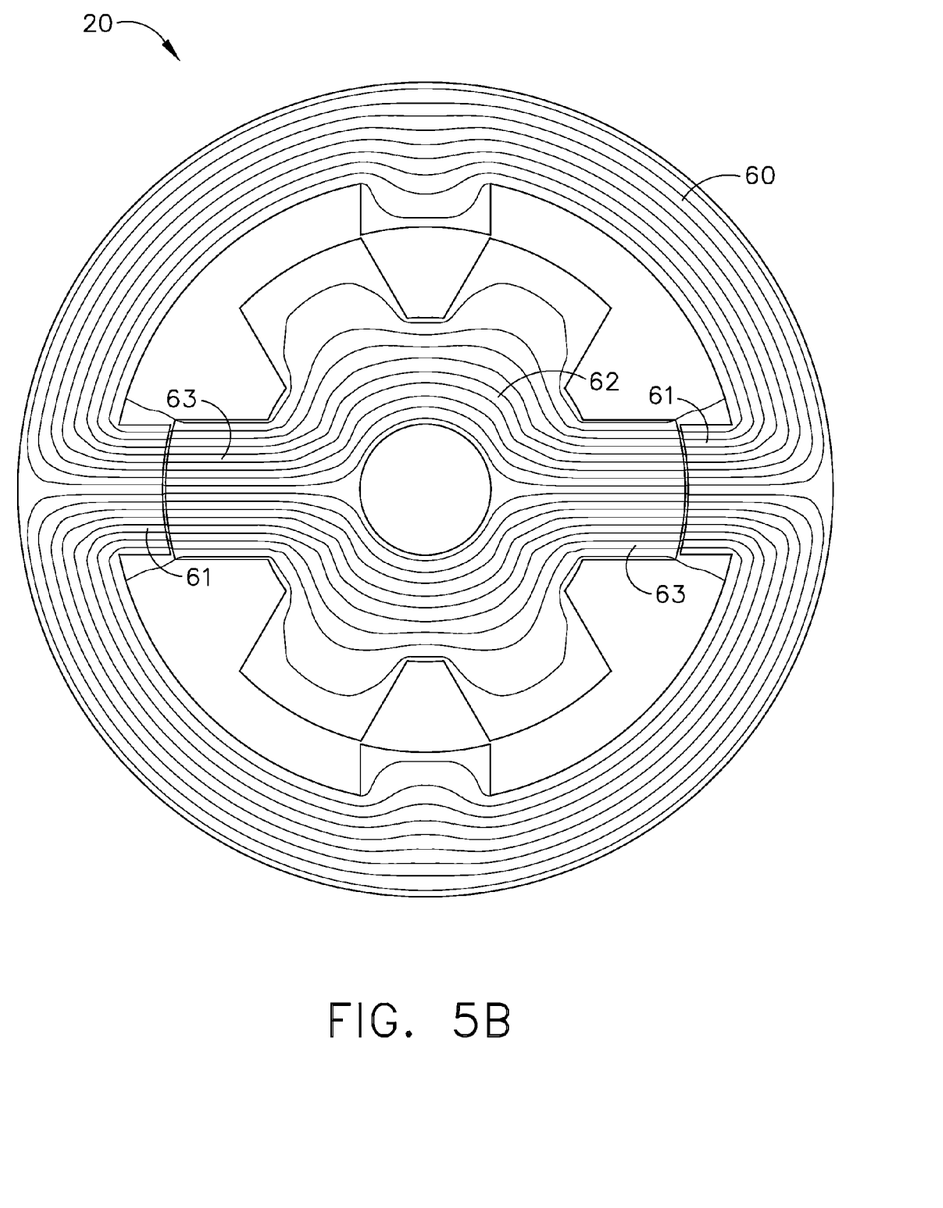
FIG. 5B illustrates the engaged flux distribution of the present invention.

FIGS. 5A and 5B illustrate an exemplary inside out switched reluctance machine (SRM) for use in the present invention. The rotor 60 is coupled to the aft turbine (not shown) of the engine. The rotor 60 rotates around the stator 62 in which there are multiple phase windings (not shown). Specifically, FIGS. 5A and 5B illustrate an embodiment of the present invention where the stator has six poles and the rotor has four. FIG. 5A shows the flux path when the rotor poles 61 out of direct alignment with the stator poles 63. The magnetic flux is weak without the direct alignment of the poles 61, 63. FIG. 5B illustrates the magnetic flux when the rotor poles 61 are in direct alignment with the plurality of stator poles 63. The magnetic flux is stronger and concentrated and has a defined flow path through the rotor 60 to the stator 62. The permeance of the magnetic flux path varies as the rotor 60 rotates circumferentially around the stator 62 and as the rotor pole 61 align with the stator poles 63. Electric power will be generated in the stator windings due to interaction of the varying permeance and the flux driven by the injected alternative current in the multiple phase, 3-phase in this example, stator windings based on switched reluctance machine principles, which are commonly known in the art.

Figure 6:
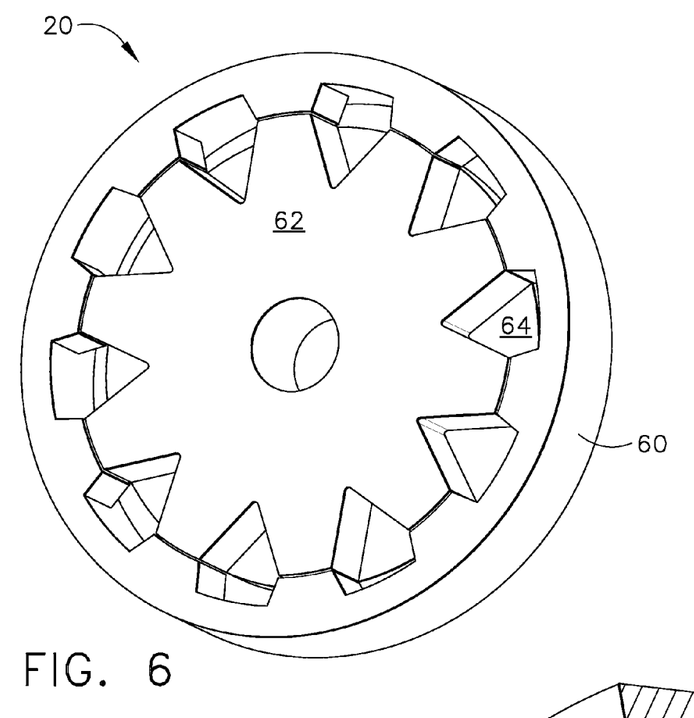
FIG. 6 illustrates a cross sectional view of a single phase of the generator of the present invention.
Figure 7:
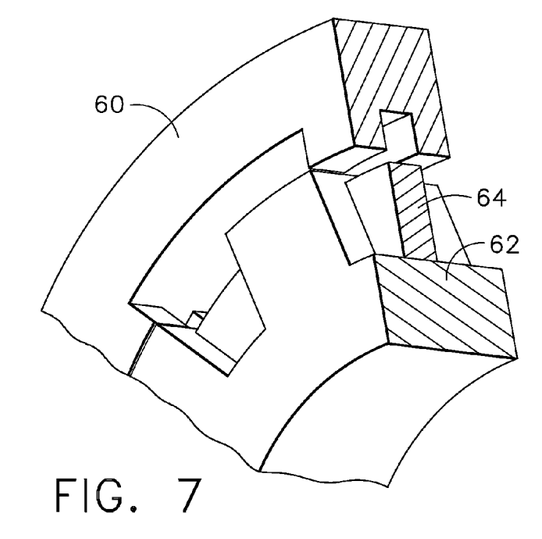
FIG. 7 illustrates a prospective view of the generator of the present invention.

Referring now to FIGS. 6 and 7, one phase of an inside-out transverse flux SRM 20 is shown. The machine consists of the stator core 62, located in the center of the generator 20 and being surrounded circumferentially by the rotor core 60. The stator coil is disposed on the stator core 62, also inside the rotor core 60. FIG. 7 illustrates an alternate view of one of multiple phases of the transverse-flux SRM. As shown in the other views of the SRM stack, the rotor 60, which rotates around the stator, circumferentially surrounds the stator core 62 and coil 64. The stator coil 64 is disposed within the stator core 62 and rotates to provide the excitation for electric power generation. For simplicity purposes, only one of multiple phases is shown in FIGS. 6 and 7, although the whole transverse-flux SRM machine may consist of many phases to reduce the ripple torque and/or provide more power. The multiple-phases are formed by axially stacking phases together with certain degree phase shift between them.

Figure 8A:
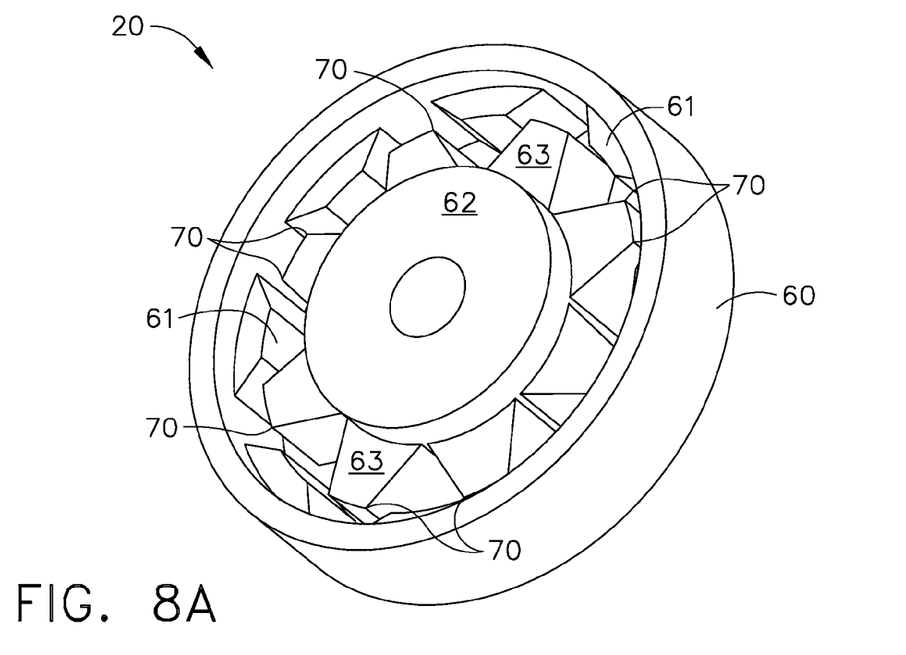
FIG. 8A illustrates the flux arrangement of the present invention when the stator is not in alignment with the rotor.
Figure 8B:
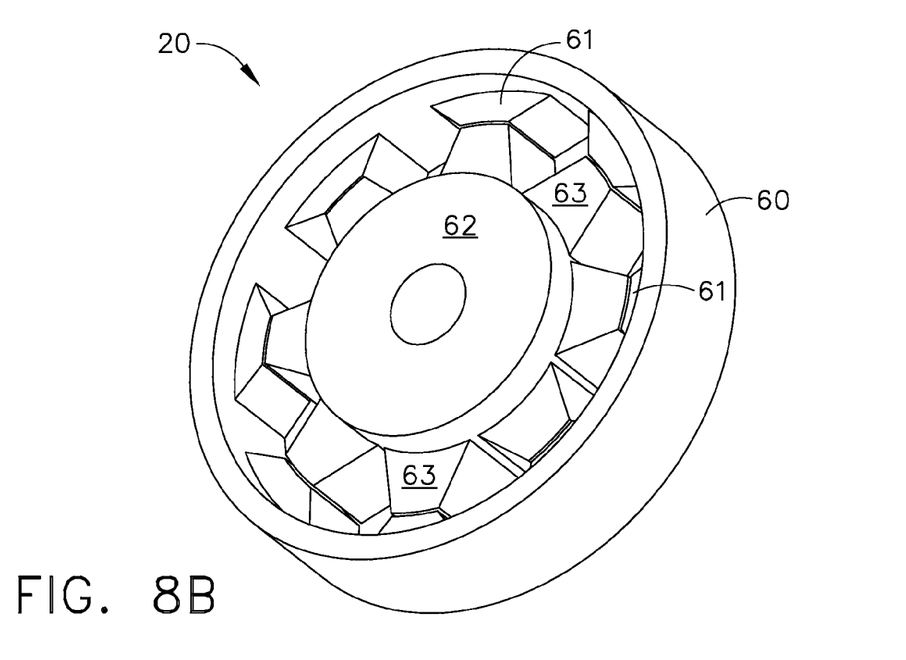
FIG. 8B illustrates the flux arrangement of the present invention when the stator is in alignment with the rotor.

FIGS. 8A and 8B illustrate the flux distribution of the inside out transverse flux SRM 20. FIG. 8A illustrates the SRM 20 when the stator core 62 is not in direct contact with the rotor 60. The corners 70 of the stator core 62 have the largest quantity of flux because they corners 70 are the portion of the stator core 62 that are closest to the rotor 60. When the stator poles 63 are in a direct link close proximity to the rotor poles 61, the magnetic flux has the strongest magnitude. Therefore, as shown in FIG. 8B, when the stator poles 63 is in direct link to the rotor poles 61, the flux distribution is the strongest. The permeance of the magnetic flux path varies as the rotor 60 rotates circumferentilly around the stator 62 and as the rotor pole 61 aligns with the stator poles 63. Electric power will be generated in the stator windings due to interaction of the varying permeance and the flux driven by the injected alternative current in the stator windings due to interaction of the varying permeance and the flux driven by the injected alternative current in the stator windings based on transverse-flux switched reluctance machine principle.

Figure 9A:
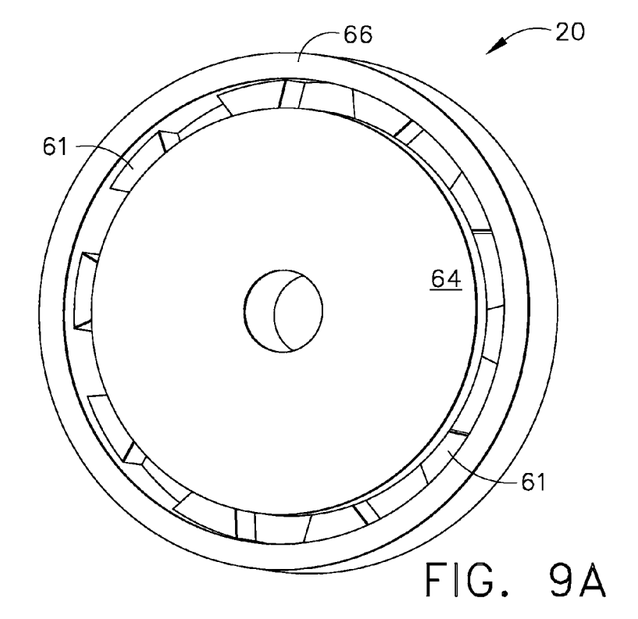
FIG. 9A illustrates a single phase, 8-pole, 3-phase switched reluctance motor with a stator shown
Figure 9B:
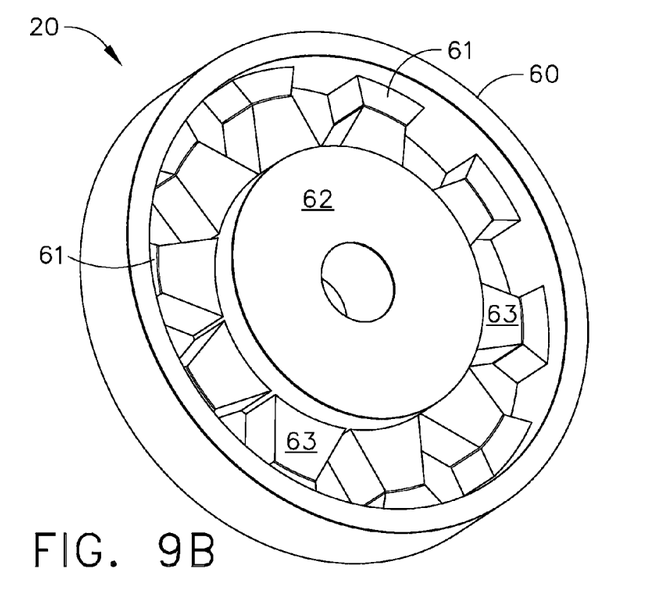
FIG. 9B illustrates a single phase, 8-pole, 3-phase switched reluctance motor.
Figure 10:
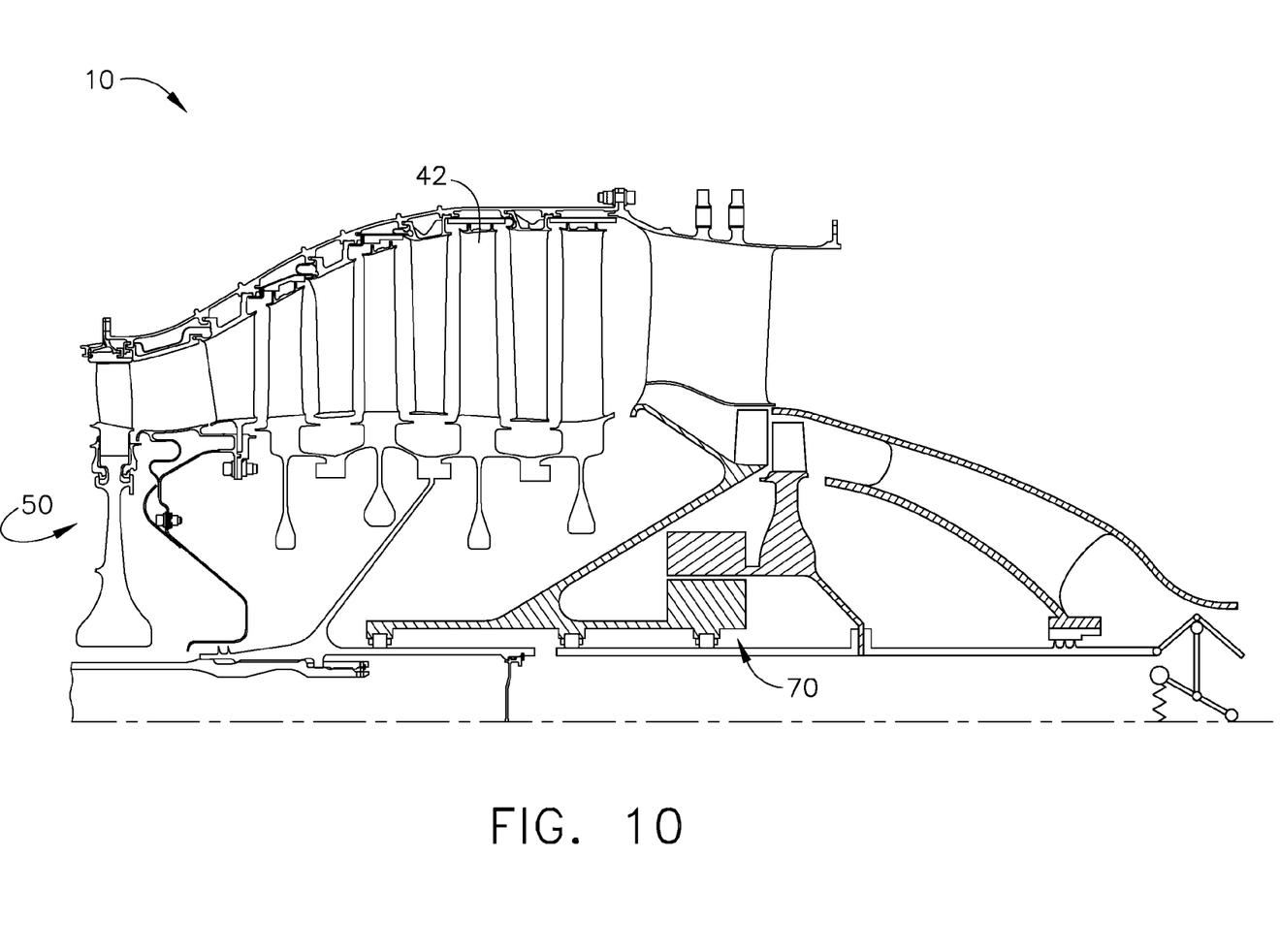
FIG. 10 illustrates a cross sectional view of an alternate embodiment of the present invention.
Figure 11:
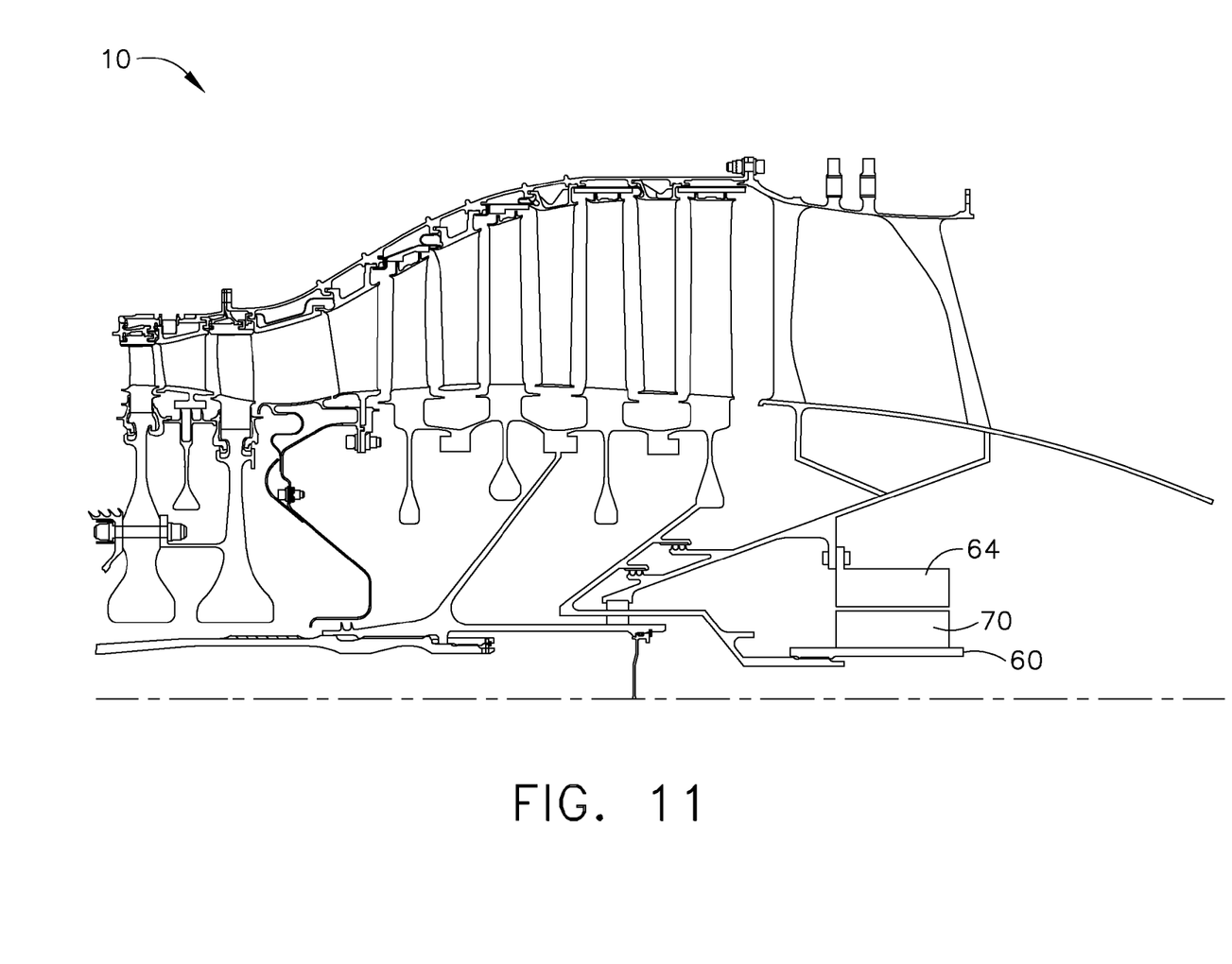
FIG. 11 illustrates a cross sectional view of another alternate embodiment of the present invention.

FIG. 9 illustrates another view of the transverse-flux SRM shown in FIGS. 6-8. FIG. 9A shows half of one phase with the stator coil 62 attached. In addition, FIG. 10 illustrates yet another embodiment of the present invention with an electric generator 70 located aft of the low-pressure turbine. Also, FIG. 11 illustrates another alternate embodiment of the present invention where an electric generator 70 is disposed between the stator 64 and the rotor 60.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for generating electrical energy comprising:
    an engine, the engine having a high pressure turbine, a low pressure turbine, an aft turbine and a discharge flow;
    a generator disposed aft of the low pressure turbine, the generator comprising:
    a stator core comprising a plurality of stator coils mounted in recesses in the stator core, wherein the plurality of stator coils and stator core are substantially static;
    and a rotor core comprising a reluctance-type core comprised of magnetically-permeable material without windings, wherein the rotor core is mechanically coupled to the aft turbine;
    wherein the rotor core being disposed circumferentially around the stator core and the plurality of stator coils, thus eliminating cooling requirements for the rotor and eliminating or simplifying cooling attributed to the inner stator;
    a duct arranged in serial flow communication with the low pressure turbine; and
    a variable nozzle disposed in the duct;
    wherein the variable nozzle controls the flow in the duct, and wherein the flow in the duct provides excitation to the rotor core and channels flow in the duct to bypass the generator.

2. The system of claim 1 wherein the rotor core is one of the group consisting of a switched reluctance rotor and a synchronous reluctance rotor.

3. The system of claim 1 wherein the stator core and the rotor core are formed with a soft magnetic composite material.

4. The system of claim 3 wherein the soft magnetic material is one of iron, magnetic steel, silicon iron, and an iron-cobalt alloy.

5. The system of claim 1 wherein the duct directs the discharge flow of the engine through the rotor during idle operation of the engine.

6. A system for an aircraft engine for generating electric electrical energy comprising:
    an inside out reluctance-type generator, the generator being placed aft of a low pressure turbine of the aircraft engine, having a plurality of stator coils, a stator core, and a rotor core, such that the cooling requirements for the rotor are eliminated and the cooling attributed to the inner stator is simplified or eliminated;
    a duct arranged in serial flow communication with the low pressure turbine; and
    wherein the duct distributes a discharge flow of the aircraft engine to provide excitation to the rotor core to produce electric power.

7. The system of claim 6 wherein the plurality of stator coils and the stator core are substantially static and are secured by bearings.

8. The system of claim 6 wherein the variable nozzle is configured to close the duct to bypass the generator to allow the aircraft engine to operate normally and with a clear flow path during a takeoff of an aircraft.

9. The system of claim 6 wherein the variable nozzle diverts the flow into the duct and through the rotor during idle operation of the engine.

10. The system of claim 6 wherein the rotor core is any one of the group of a switched reluctance rotor and a synchronous reluctance rotor.

11. The system of claim 6 wherein the stator core and the rotor core are formed by using a soft magnetic composite material.

12. The system of claim 11 wherein the soft magnetic composite material is one of iron, magnetic steel, silicon iron, and an iron-cobalt alloy.

* * * * *